United States Patent
Sugimori

[11] Patent Number: 6,030,223
[45] Date of Patent: Feb. 29, 2000

[54] OPERATING DEVICE FOR MOTORCYCLE SIMULATION APPARATUS

[75] Inventor: Yuji Sugimori, Tokyo, Japan

[73] Assignee: Sega, Tokyo, Japan

[21] Appl. No.: 08/793,856

[22] PCT Filed: Jun. 27, 1996

[86] PCT No.: PCT/JP96/01783

§ 371 Date: Feb. 24, 1997

§ 102(e) Date: Feb. 24, 1997

[87] PCT Pub. No.: WO97/09703

PCT Pub. Date: Mar. 13, 1997

[30] Foreign Application Priority Data

Sep. 8, 1995 [JP] Japan ................................. 7-230980

[51] Int. Cl.[7] .................................................. G09B 9/04
[52] U.S. Cl. ........................................................ 434/61
[58] Field of Search ............................... 434/61, 69, 29, 434/307 R, 247, 62, 308, 55, 57; 364/578; 463/6, 7; 273/148 B; 446/440; 180/218; 395/500.25; 472/130

[56] References Cited

U.S. PATENT DOCUMENTS

| | | | |
|---|---|---|---|
| 4,887,967 | 12/1989 | Letovsky et al. | 434/61 |
| 5,240,417 | 8/1993 | Smithson et al. | 434/61 |
| 5,364,271 | 11/1994 | Aknin et al. | 434/61 |
| 5,547,382 | 8/1996 | Yamasaki et al. | 434/61 |

FOREIGN PATENT DOCUMENTS

| | | | |
|---|---|---|---|
| 0 406 729 A1 | 1/1991 | European Pat. Off. | 434/61 |
| 42 07 805 A1 | 9/1993 | Germany | 434/61 |
| 451076 | 2/1992 | Japan . | |
| 6-4019 | 1/1994 | Japan | 434/61 |
| 6-51695 | 2/1994 | Japan | 434/61 |
| 635395 | 2/1994 | Japan . | |
| 6-118866 | 4/1994 | Japan | 434/61 |
| 7199789 | 8/1995 | Japan . | |
| 127600 | 1/1990 | Taiwan . | |
| 138466 | 7/1990 | Taiwan . | |
| 253221 | 8/1995 | Taiwan . | |

Primary Examiner—Joe H. Cheng
Attorney, Agent, or Firm—Price, Gess & Ubell

[57] ABSTRACT

A vehicle body (6) provided with a seat portion (7) and footstools (8) is positioned on a fixed frame (2), which is positioned in a horizontal direction facing opposite a screen (1a) of a display (1), extending in a direction running at a right angle to the screen. In order to provide an operating device for a motorcycle simulation apparatus that provides a realistic feeling of operation, a handlebar (4) is secured on to a mobile frame (3) which is mounted in such a manner that it can slide freely in the left and right direction relative to the fixed frame, and the vehicle body is structured in such a manner that it can be caused to pivot freely in the left and right direction relative to the mobile frame by a pivoting mechanism (10) which includes a supporting shaft (5). The pivoting range of the vehicle body is regulated by a position regulating mechanism (30). When the vehicle body becomes inclined in the left and right direction, the operator can pull up the vehicle body to a vertical position while leaving his feet on the footstools by controlling his posture by holding the handlebar. The load applied to the vehicle body when the vehicle body is made to incline by placing weight on it works to cause the mobile frame to move to the opposite side from the side of inclination.

34 Claims, 9 Drawing Sheets

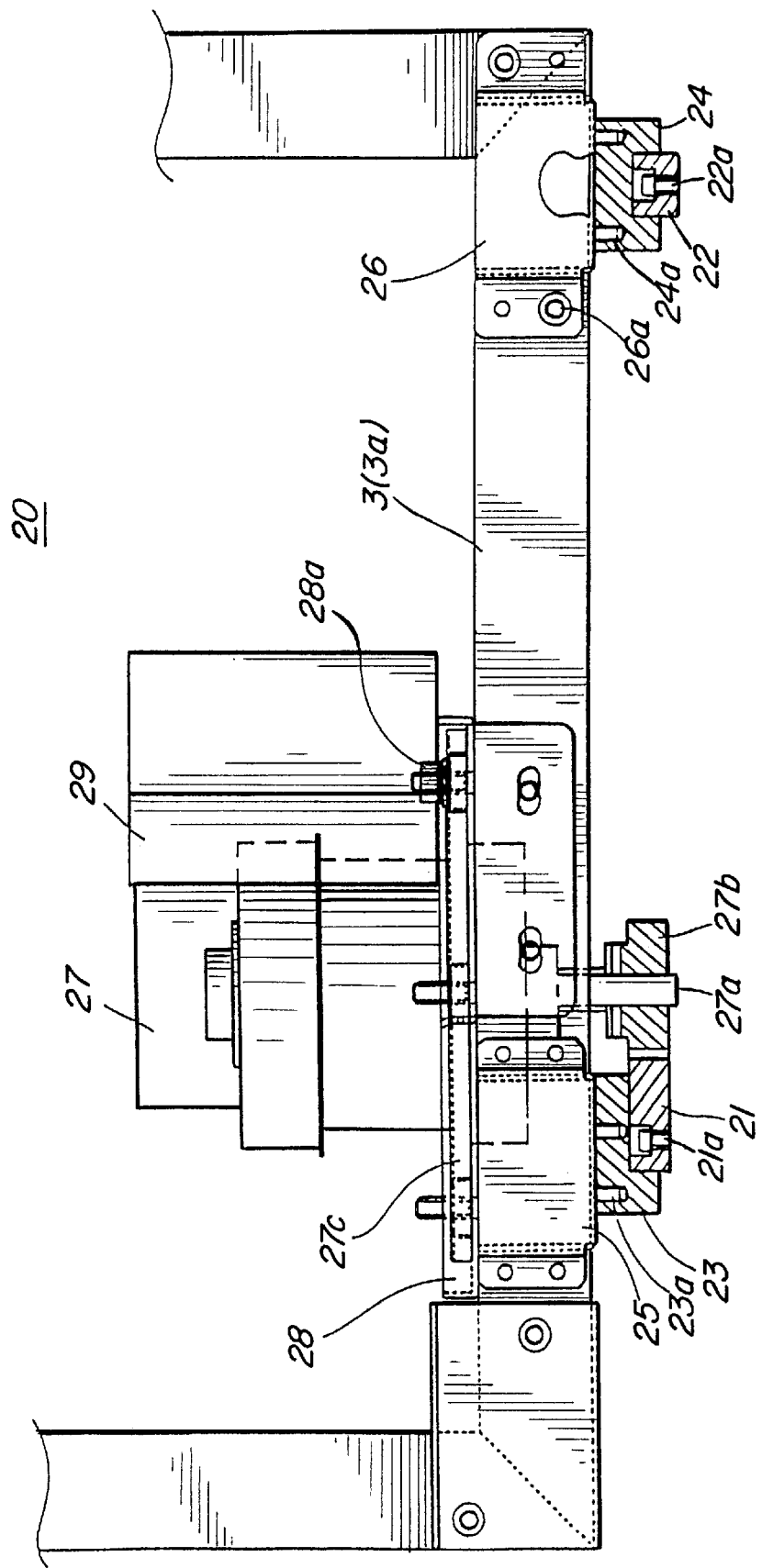

OPERATING DEVICE FOR MOTORCYCLE SIMULATION APPARATUS

FIELD OF THE INVENTION

The present invention relates to an operating device for a simulation type game machine that is played with a screen image controlled by a computer projected on a display. To be more specific, the present invention relates to an operating device for a motorcycle simulation apparatus in which the operating device, shaped to resemble a motorcycle, is provided in front of the display and images projected on the display are changed by operations performed by the operator while sitting astride the operating device in a posture similar to that adopted when riding a motorcycle.

BACKGROUND OF THE INVENTION

Simulation type game machines that employ computer screen images include motorcycle simulation apparatuses. In such motorcycle simulation apparatuses, points are won by controlling a motorcycle in a racing scene projected on a display by operating an operating device provided in front of the display. Operating devices for such motorcycle simulation apparatuses include those that employ simple input devices such as levers or buttons but those that are shaped to resemble a motorcycle are particularly popular because they create a sense of reality.

Such operating devices in the shape of a motorcycle in the known art include those disclosed in Japanese Unexamined Patent Publication Nos. 1989/214385 and 1992/22383. In these operating devices in the prior art, a motorcycle-shaped vehicle body is supported on a base provided on the floor in such a manner that the vehicle body can incline to the left and right with a handlebar provided as an integral part of the vehicle body. With such an operating device in the prior art, by operating a throttle grip and a brake lever at the ends of the handlebar, the speed at which the view to the front of the motorcycle projected on the display moves is controlled, and by inclining the entire vehicle body to the left and right, the direction in which the motorcycle advances on the display is controlled.

However, in the prior art technology described above, since the handlebar is provided as an integral part of the vehicle body, which inclines to the left and right, it is not possible for the operator, who sits astride the vehicle body, to perform operation with his feet off the floor or the base and on the footstools provided on the vehicle body. In other words, when operating an operating device in which the handlebar is provided as an integral part of the vehicle body, if the operator has his feet off the floor or the base, on the footstools, the entire weight of the operator is on the vehicle body. When the operator has all his weight on the vehicle body, once the vehicle body is inclined, it is difficult to restore it to the original, vertical state by pulling up the vehicle body. Because of this, when operating this type of operating device, the operator leaves both his feet on the floor or the base, and when the vehicle body is inclined, he pulls the vehicle body up to the vertical state by bracing with his feet against the floor or the base.

However, when actually riding a motorcycle, the rider places his feet on the footstools provided on the vehicle body of the motorcycle, not on the ground. Thus, performing operation on an operating device in the prior art described above with the feet placed on the floor or the base is totally different from the feel of riding a real motorcycle and detracts from the feel of the game.

In addition, in the operating device in the prior art, a support shaft is provided parallel to the floor surface at a position close to the floor to support the lower portion of the vehicle body in such a manner that the vehicle body can pivot freely thereupon when the vehicle body is inclined to the left or right. Because of this, when the vehicle body is inclined, the head of the operator moves to the left or right, in effect, pivoting on the supporting shaft and becoming greatly misaligned from the center of the display provided in front of the vehicle body, making it difficult to see the image on the display.

Furthermore, when a real motorcycle negotiates a curve, an operation whereby the vehicle body and the front wheel are articulated in conformance to the direction of the road, as well as an operation for simply inclining the vehicle body to the left or right, is required. Consequently, performing an operation for simply inclining the vehicle body to the left or right with the operating device in the prior art feels unnatural and results in a different attitude in the vehicle body, from that when a real motorcycle is being ridden and this, too, detracts from the quality of the simulation.

Moreover, when riding a real motorcycle, the centrifugal forces and the like applied to the vehicle body vary while passing through a curve, depending upon the speed and acceleration of the motorcycle effected by the use of the accelerator and the brake, resulting in varying levels of force required for inclining the vehicle body. However, with the operating device in the prior art, such varying reactions from the vehicle body, which correspond to operations, cannot be obtained, and the force required to incline the vehicle body is also constant. This, too, makes it feel different from riding a real motorcycle, detracting from the player's enjoyment of the game.

An object of the present invention is to provide an operating device for a motorcycle simulation apparatus that makes it possible to perform an operation that creates a feeling similar to that of riding a real motorcycle and is also compact and simple, by solving the problems of the prior art described above. More specifically, an object of the present invention is to provide an operating device for a motorcycle simulation apparatus that has at least one of the following four features.

(a) Assuring operability in the state in which the feet of the operator are placed on the footstools:

Even with the vehicle body inclined to the left or right, the operator can perform operation with both feet placed on the footstools of the vehicle body.

(b) Maintaining the position of the operator's head relative to the display:

Even when the vehicle body is inclined to the left or right, the movement of the head of the operator is minimized.

(c) Assuring an attitude of the vehicle body that is closer to reality:

It is possible to perform an operation that feels more realistic with the attitude of the vehicle body more analogous to that of a real motorcycle.

(d) Assuring reactions that are similar to the reactions of a real motorcycle:

Reactions that are closer to reality can be obtained from the vehicle body in correspondence to the state of the course displayed on the display and/or in response to the operations of the accelerator and/or the brake.

SUMMARY OF THE INVENTION

In the present invention, the object described above is achieved by providing an operating device for a motorcycle simulation apparatus in which an operating device resembling a motorcycle is positioned in front of the screen of a display, with a handlebar that is secured separate from the vehicle body and by ensuring that the vehicle body can pivot relative to this handlebar.

In a typical embodiment of the present invention, a mobile frame constituted in such a manner that it can move freely in the horizontal direction relative to the screen is provided in front of the screen of the display. The handlebar is secured on to this mobile frame, the vehicle body is positioned across the handlebar on the opposite side from the display with the seat portion provided at a position away from the handlebar. A supporting shaft, which supports the vehicle body on an axis in such a manner that the vehicle body can pivot freely relative to the handlebar, is provided extending in the back and forth direction of the vehicle body. In addition, a mobile shaft is provided in the area under the seat portion of the vehicle body. This mobile shaft, the axis of which runs parallel to the supporting shaft and is closer to the seat portion than the axis of the supporting shaft, is constituted in such a manner that its movement in the horizontal direction mentioned earlier is regulated.

In this device, the handlebar is secured on to the mobile frame and only the vehicle body pivots relative to the mobile frame and handlebar. Because of this, when the vehicle body becomes inclined in the left or right direction, the operator can pull the vehicle body up to the vertical position while leaving his feet on the footstools, by holding onto the handlebar for balance. As a result, even when the vehicle body is inclined with the operator's feet off the floor or the base, it is possible to restore the vehicle body to the vertical position and, thus, an operating feel close to that experienced when operating a real motorcycle is obtained.

Particularly, since the vehicle body is capable of pivoting relative to the mobile frame and the handlebar, when the operator's weight is placed on the vehicle body to cause it to incline to one side in the left and right direction with the supporting shaft at the center, the load applied to the vehicle body acts to cause the mobile frame to move toward the side opposite from the side of inclination via the supporting shaft. Consequently, in addition to merely causing the vehicle body to incline, it is possible to obtain the feel of drift in the lateral direction that is felt when riding a real motorcycle. In addition, since the mobile frame can be made to move to the opposite side from the direction of inclination of the vehicle body, even if the operator greatly inclines the upper body, the actual lateral movement range of the operator's head is reduced, facilitating viewing of the display.

BRIEF DESCRIPTION OF THE DRAWINGS

FIG. 6 respectively is a side elevation of FIG. 5.

Note that the correspondence between the main members and reference numbers is as follows:
1 . . . display, 1a . . . screen, 2 . . . fixed frame, 3 . . . mobile frame,
4 . . . handlebar, 5 . . . supporting shaft, 6 . . . vehicle body,
7 . . . seat portion, 8 . . . footstools,
10 . . . pivoting mechanism, 20 . . . sliding mechanism,
30 . . . position regulating mechanism.

DETAILED DESCRIPTION OF THE PREFERRED EMBODIMENT

The following is an explanation of an embodiment of the motorcycle simulation apparatus according to the present invention in reference to the drawings.

Figure 1:
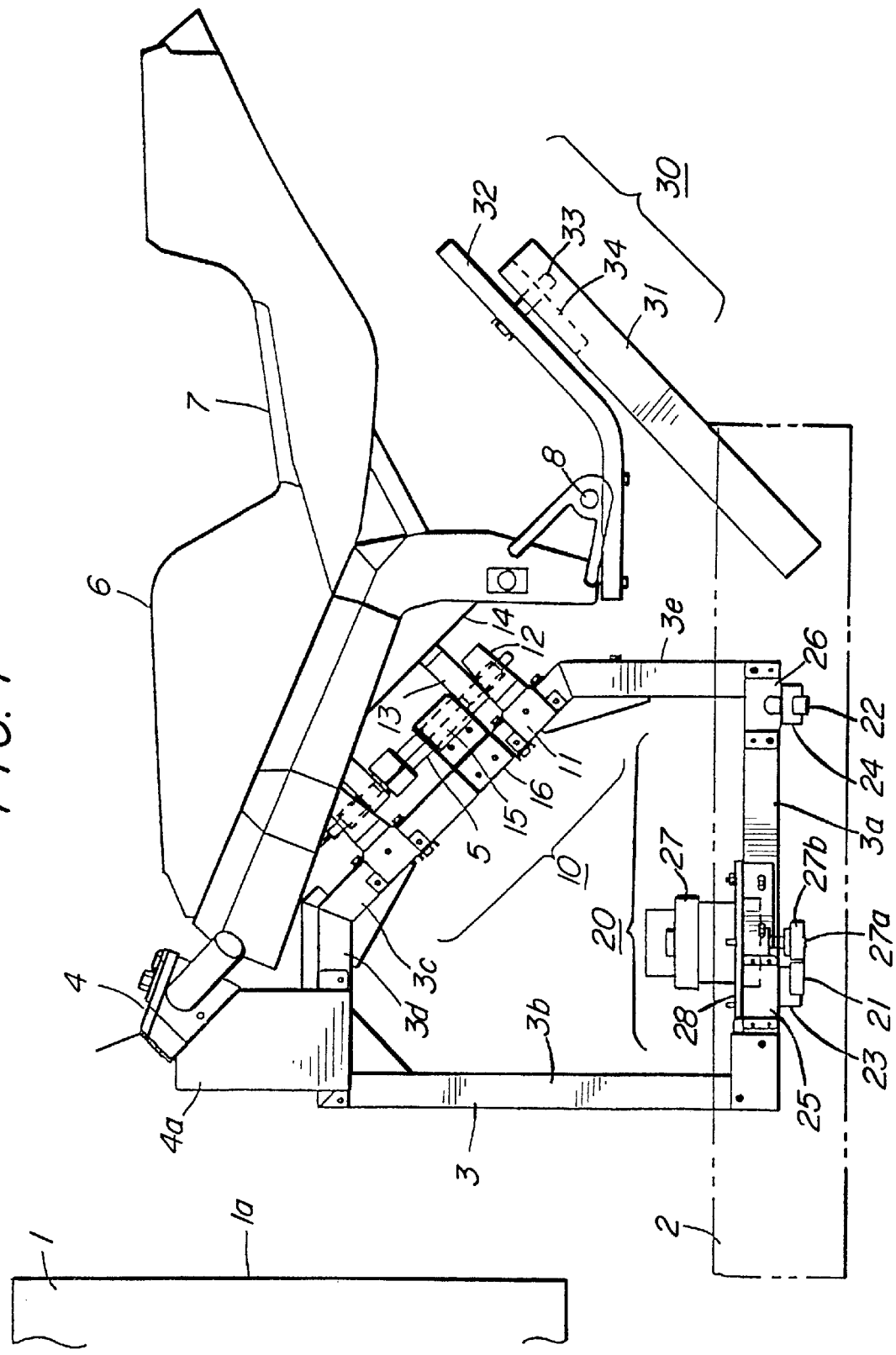
FIG. 1 is a side elevation of an embodiment of the operating device for a motorcycle simulation apparatus according to the present invention and FIG. 2 is a plan view of FIG. 1.
Figure 2:
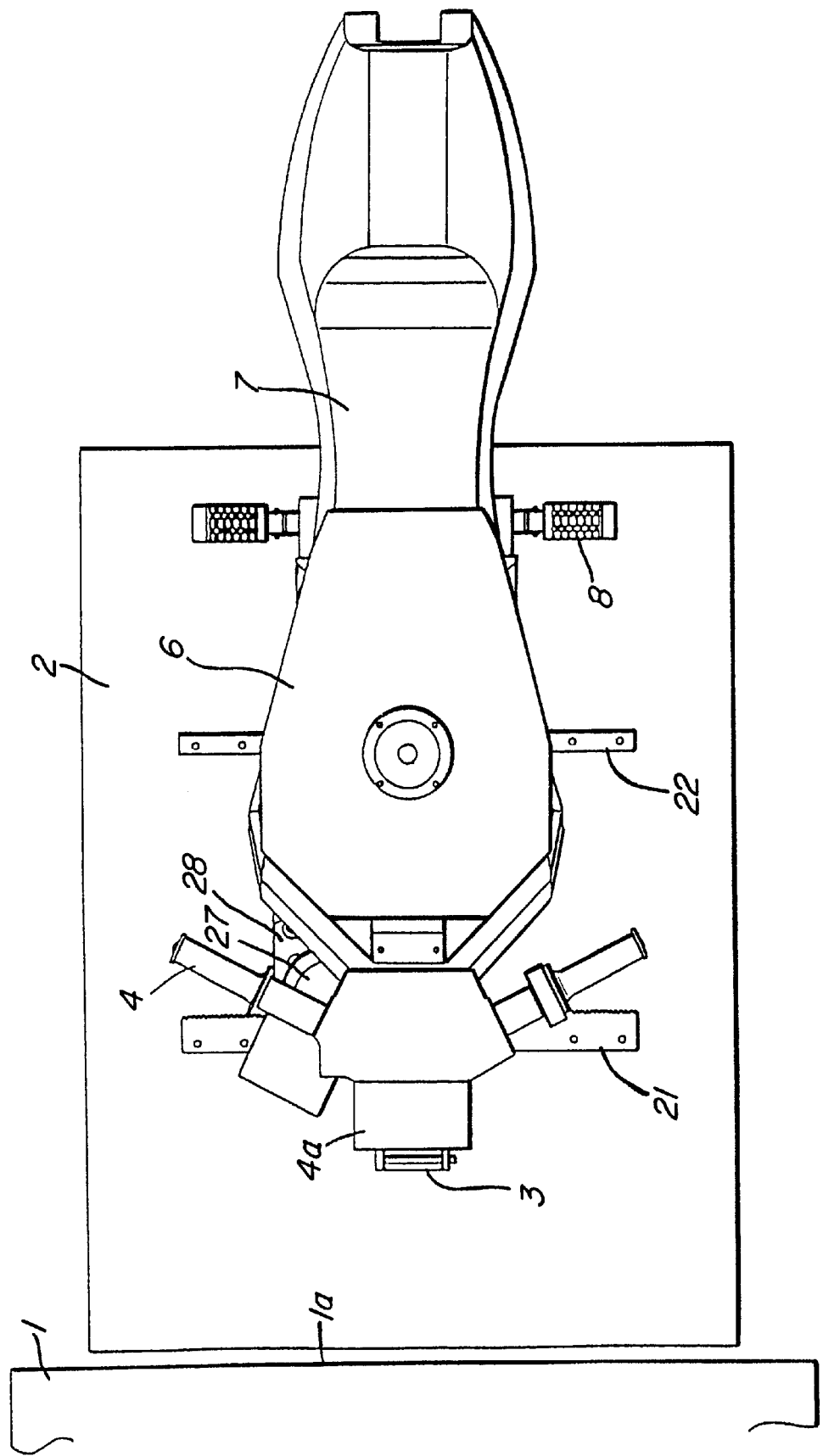

(1) Structure (1-1) Structural Overview . . . FIGS. 1 and 2

FIG. 1 is a side elevation of an embodiment of the operating device for a motorcycle simulation apparatus according to the present invention and FIG. 2 is a plan view of FIG. 1. In reference to FIGS. 1 and 2, a display 1 is vertically positioned as shown in FIG. 1 and provided with a screen 1a extending in the vertical direction. The display 1 is positioned in such a manner that its screen 1a extends in the horizontal direction, as shown in FIG. 2.

As shown in FIG. 1, the operating device is located in front of the screen 1a of the display 1. This operating device is provided with a fixed frame 2, a mobile frame 3, a handlebar 4, a supporting shaft 5, a vehicle body 6, a seat portion 7 and footstools 8 as its basic component members. The operating device is also provided with a pivoting mechanism 10, a sliding mechanism 20, a position regulating mechanism 30 as mechanisms for regulating relative operations among the component members. First, an overview of the structures of and positional relationships among these elements is given below.

As shown in FIG. 1, the fixed frame 2 is provided horizontally on the floor surface to face opposite the screen 1a of the display 1. This fixed frame 2 is constituted in a rectangular shape with the front and rear short sides constituting a pair, extending in the left and right direction in relation to the screen 1a of the display 1 and with the left and right long sides constituting a pair, extending in the front and rear direction in relation to the screen 1a of the display 1, as shown in FIG. 2. In addition, at the central portion on this fixed frame 2 in the left and right direction, the vehicle body 6 is provided extending horizontally in the direction running at a right angle to the screen 1a. This vehicle body 6 has an outward shape that resembles that of a real motorcycle. In addition, as shown in FIG. 1, the seat portion 7 where the operator sits is provided toward the rear of the vehicle body 6 on the opposite side from the display 1, and in the lower portion of the vehicle body 6, slightly toward the front in relation to the seat portion 7, the footstools 8, where the operator's feet are placed, are provided.

Also, as shown in FIG. 1, the mobile frame 3 is provided under the front portion of the vehicle body 6 on the fixed frame 2, extending in the front and rear direction as shown in FIG. 1. In FIG. 2, only the front end portion of the mobile frame 3 is shown since the mobile frame 3 is covered by the vehicle body 6 above it. However, as in the case of the vehicle body 6, it is positioned centrally on the fixed frame 2 in the left and right direction, extending in the front and rear direction. In other words, the mobile frame 3 is positioned in such a manner that when it is at the vertical position in the initial state, as shown in FIG. 2, its central axis is aligned with the central axis of the vehicle body 6 in the vertical direction.

To give a more detailed explanation, the mobile frame 3 is formed in a pentagonal shape, as shown in FIG. 1. In other words, the mobile frame 3 is constituted with the following major portions, i.e., a lower horizontal portion 3a mounted to the fixed frame 2, extending in the front and rear direction, a front vertical portion 3b that rises vertically from the front end of the lower horizontal portion 3a and an inclined portion 3c that inclines down from the front toward the rear. In addition, the upper ends of the front vertical portion 3b and the front end of the inclined portion 3c of the mobile frame 3 are connected with an upper horizontal portion 3d, which is relatively short, and the rear end of the lower horizontal portion 3a and the rear end of the inclined portion 3c are connected with a rear horizontal portion 3e, which is relatively short.

Furthermore, as shown in FIG. 1, a handlebar mounting base 4a is secured to the upper horizontal portion 3d of the mobile frame 3, projecting upward, with the handlebar 4 provided at the handlebar mounting base 4a, extending diagonally from the central portion rearward to the left and right, as shown in FIG. 2. Also, above the inclined portion 3c of the mobile frame 3, the supporting shaft 5 is provided running parallel to the inclined portion 3c, and this supporting shaft 5 is constituted to support the vehicle body 6 in such a manner that the vehicle body 6 can pivot freely upon it, leaning to the left and right direction relative to the mobile frame 3. Note that, while the supporting shaft 5 inclines downward toward the rear, as does the inclined portion 3c of the mobile frame 3, its rear end is still higher than the fixed frame 2 and, consequently, the entirety of the supporting shaft 5 is provided at a high position, away from the fixed frame 2, which is positioned above the floor surface. In addition, in the area that includes the supporting shaft 5 and the inclined portion 3c of the mobile frame 3, the pivoting mechanism 10, which causes the vehicle body 6 to pivot between the initial vertical position and inclined positions on both sides to the left and right around the supporting shaft 5, is constituted.

Note that, as shown in FIG. 1, the sliding mechanism 20, which causes the mobile frame 3 to slide in the left and right direction relative to the fixed frame 2, is provided between the mobile frame 3 and the fixed frame 2. In addition, the position regulating mechanism 30, which regulates the movement of the vehicle body 6 in the left and right direction relative to the fixed frame 2, is provided between the rear end of the fixed frame 2 and the portion under the seat portion 7 of the vehicle body 6.

Figure 3:
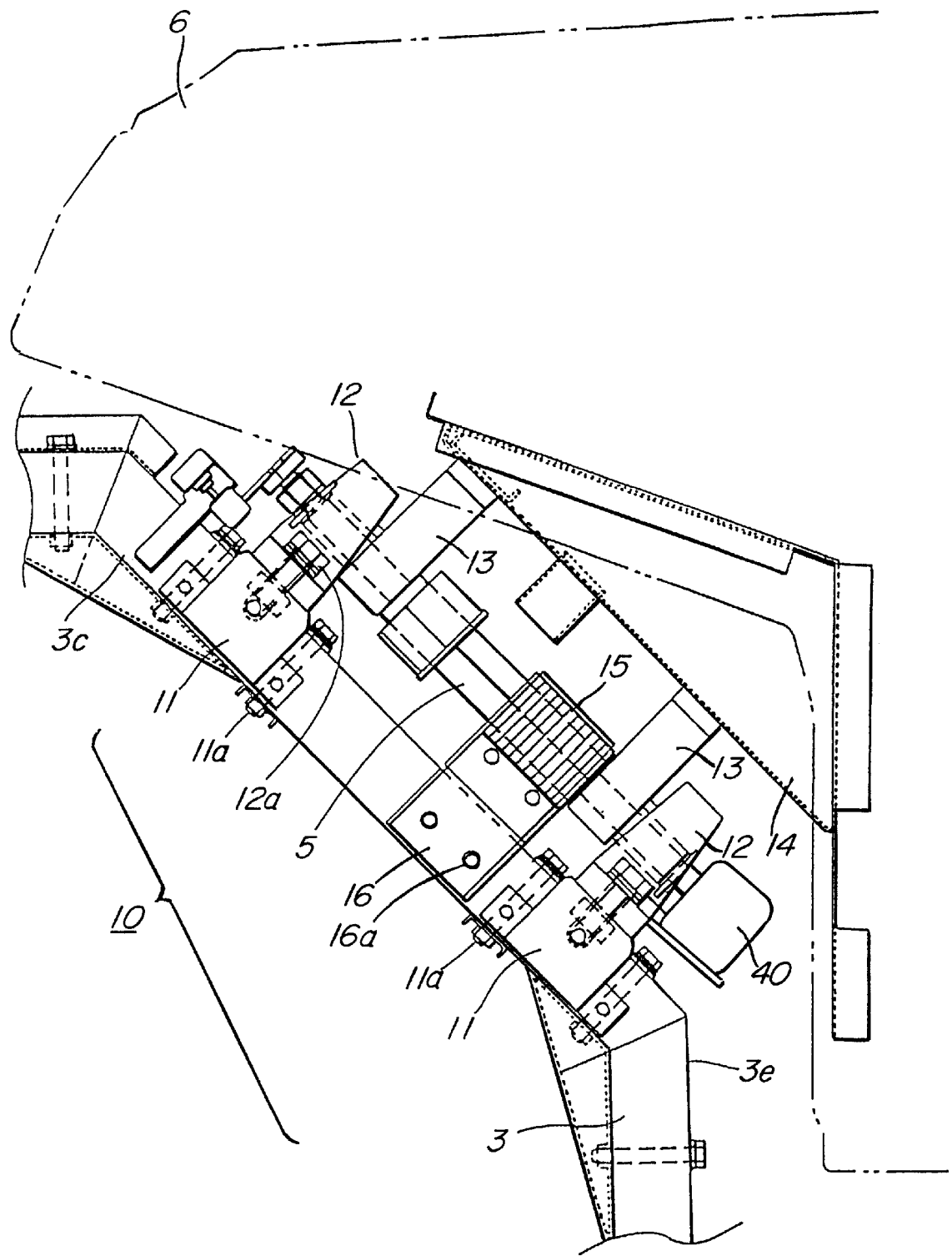
FIG. 3 is a side elevation showing the pivoting mechanism of FIG. 1.
Figure 4:
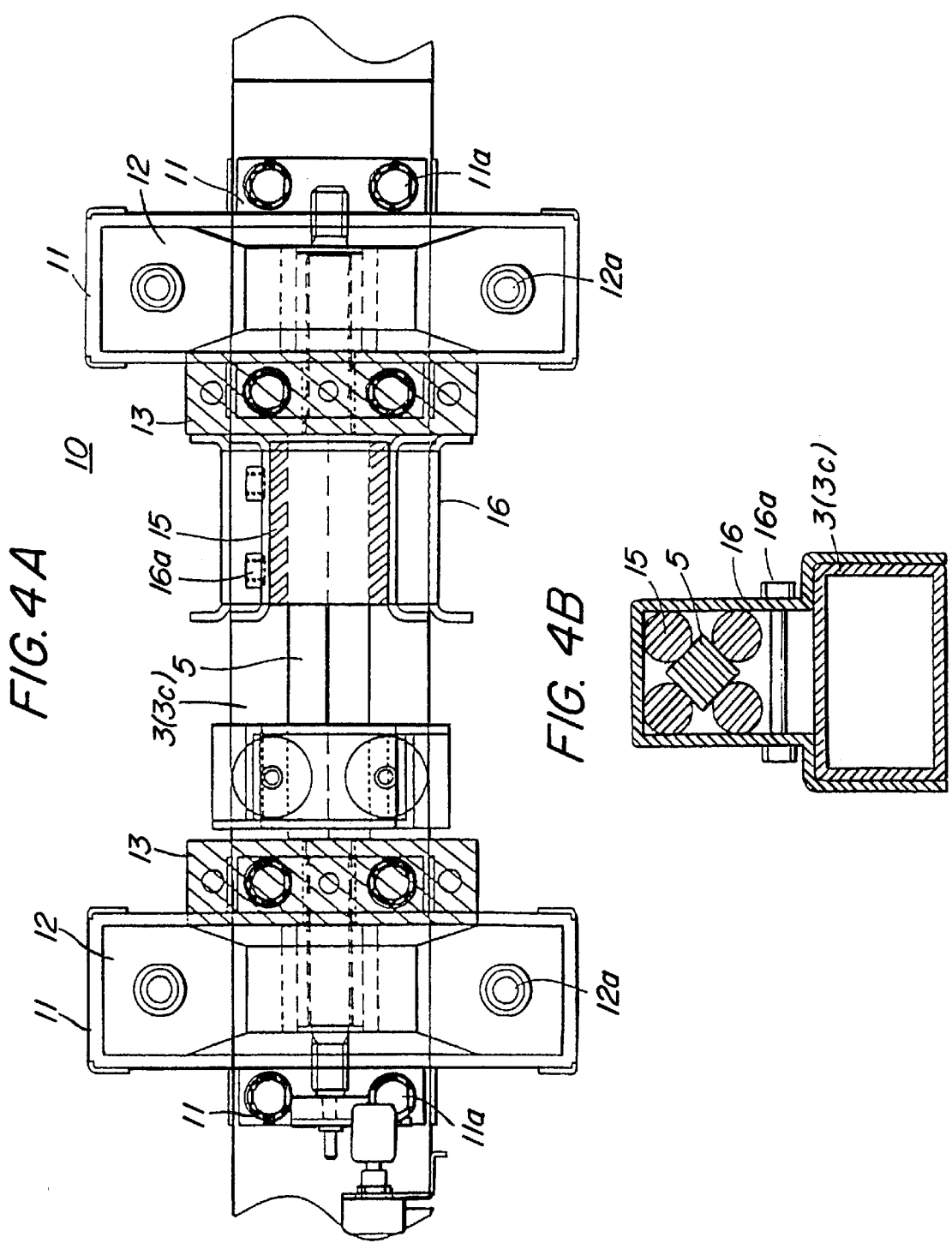
FIGS. 4(A) and 4(B) are a plan view and a cross sectional view respectively of the essential portion of the pivoting mechanism in FIG. 3.

(1-2) Structure of the pivoting mechanism 10 . . . FIGS. 3 and 4

FIG. 3 is a side elevation of the pivoting mechanism 10 and FIG. 4 includes a plan view (A) and a cross section (B) showing the essential portion of the pivoting mechanism 10. As shown in FIG. 3, the pivoting mechanism 10 is a mechanism in which the supporting shaft 5 rotates relative to the inclined portion 3c of the mobile frame 3 to cause the vehicle body 6, which is supported by the supporting shaft 5, to lean in the left and right direction.

As shown in FIG. 3, a pair of pillow-block fixed frames 11 are secured at each end of the inclined portion 3c of the mobile frame 3, with a plurality of sets of nuts and bolts 11a. On each pillow-block fixed frame 11, a pillow-block (bearing) 12 is secured with a plurality of sets of nuts and bolts 12a. The supporting shaft 5 is inserted through the pairs of pillow-blocks 12 and is supported in such a manner that it can rotate freely.

Mounting blocks 13 are bonded as integral parts of the supporting shaft 5 in the areas at the two ends and toward the center thereof relative to the pillow-blocks 12, where the diameter is reduced. This pair of mounting blocks 13 is mounted to a bracket 14 secured on the vehicle body 6 and, with this, the supporting shaft 5 and the vehicle body 6 are fixed as one.

In addition, while the two ends of the supporting shaft 5, which are inserted through the pillow-blocks 12 have a circular cross section with a diameter smaller than that in the area toward the center, the large diameter portion in the central area of the supporting shaft 5 has a rectangular cross section, as shown in FIG. 4(B). A means for force application 15, constituted with four columnar elastic members, is provided parallel to and enclosing the supporting shaft 5, at a portion of the central, large diameter portion of the supporting shaft 5 with the rectangular cross section. The four columns of the means for force application 15 are bonded to a fixed member 16, which is provided enclosing the external circumference of the entire means for force application 15. The fixed member 16 is secured to a portion of the inclined portion 3c of the mobile frame 3 with a plurality of sets of nuts and bolts 16a.

Figure 5:
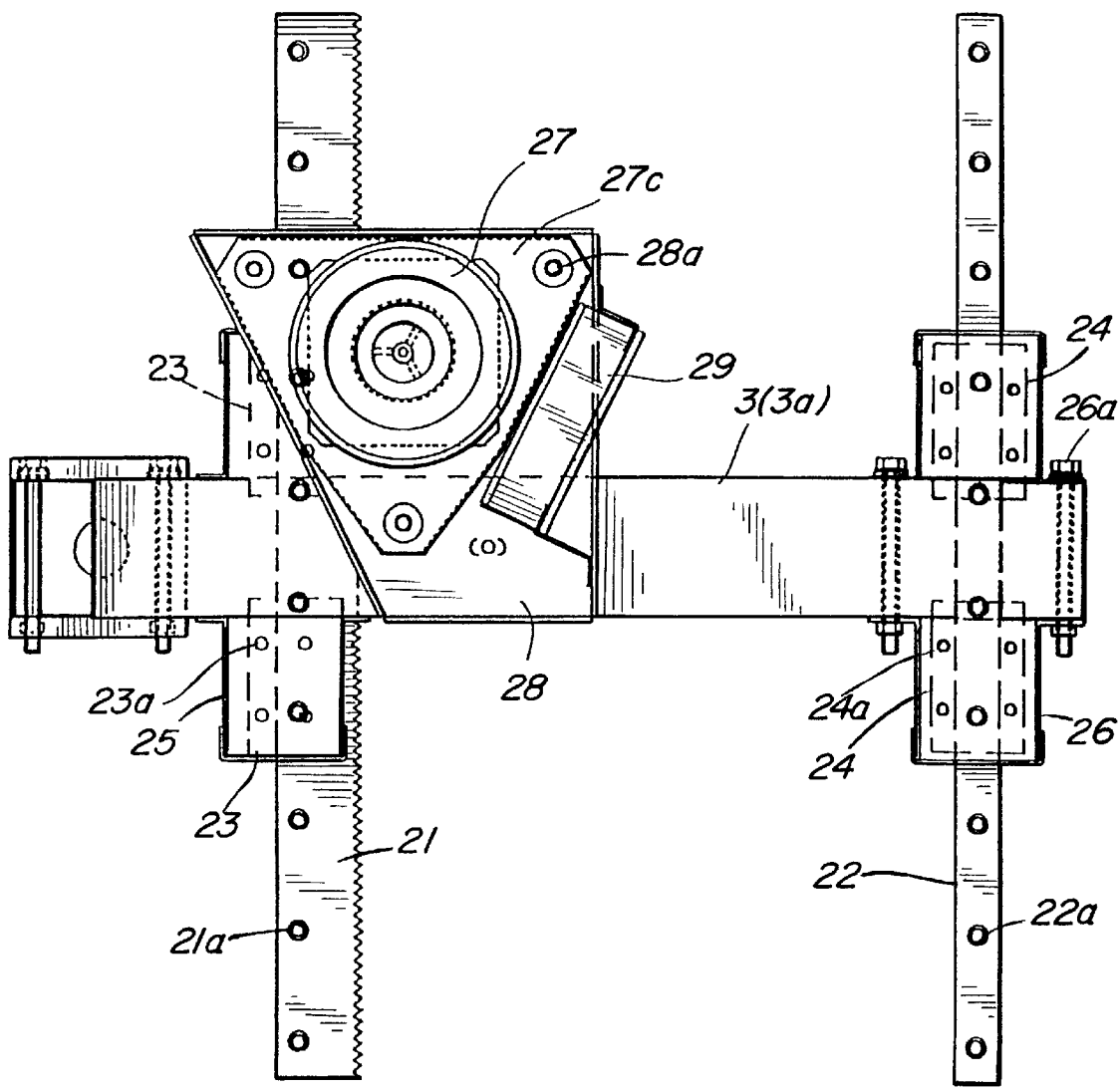
FIG. 5 is a plan view of the sliding mechanism in FIG. 1.

(1-3) Structure of the sliding mechanism 20 . . . FIGS. 1, 5 and 6

FIG. 5 is a plan view of the sliding mechanism 20 and FIG. 6 is a side elevation of FIG. 5. As shown in FIG. 1, the sliding mechanism 20 is provided with a guide rail rack 21, which is provided toward the front of the fixed frame 2, extending in the left and right direction and a guide rail 22, which is provided to the rear of the guide rail rack 21, running parallel to the guide rail rack 21 over a distance. The guide rail rack 21 and the guide rail 22 are secured to the fixed frame 2 with a plurality of sets of nuts and bolts 21a and 22a.

As shown in FIG. 5, a pair of sliders 23 and 24 which slide along the guide rail rack 21 and the guide rail 22 are provided at each end of the lower horizontal portion 3a of the mobile frame 3. These sliders 23 and 24 are mounted to the guide rail 3 via slider mounting members 25 and 26 as shown in FIG. 6. The sliders 23 and 24 are respectively secured to the slider mounting members 25 and 26 with bolts 23a and 24a, with the slider mounting members 25 and 26 bonded to the mobile frame 3. Of these, the rear slider mounting member 26 also functions as the bonding area where the lower horizontal portion 3a and the rear vertical portion 3e of the mobile frame 3 are connected with a set of nuts and bolts 26a.

In addition, as shown in FIG. 6, an electric motor 27 is provided above the lower horizontal portion 3a of the mobile frame 3, and the electric motor 27 is secured to the guide rail 3 via a motor mounting member 28 as an integral part. This electric motor 27 is provided with a motor shaft 27a extending downward with a pinion 27b mounted at its front end, and a mounting flange 27c. The mounting flange 27c of the electric motor 27 is secured to the motor mounting member 28 with a set of nuts and bolts 28a, as shown in FIG. 5, and the motor mounting member 28 is bonded to the mobile frame 3. In addition, the pinion 27b interlocks with the rack of the guide rail rack 21 and, by rotating in response to rotation of the electric motor 27, it moves in the left and right direction along the guide rail rack 21. In other words, with this movement of the pinion 27b relative to the guide rail rack 21, the electric motor 27 and the fixed mobile frame 3 move in the left and right direction. Note that a fan for cooling the electric motor 27 is provided adjacent to the electric motor 27 on the motor mounting member 28.

(1-4) Structure of the position regulating mechanism 30 . . . FIGS. 1, 7 and 8

Figure 7A:
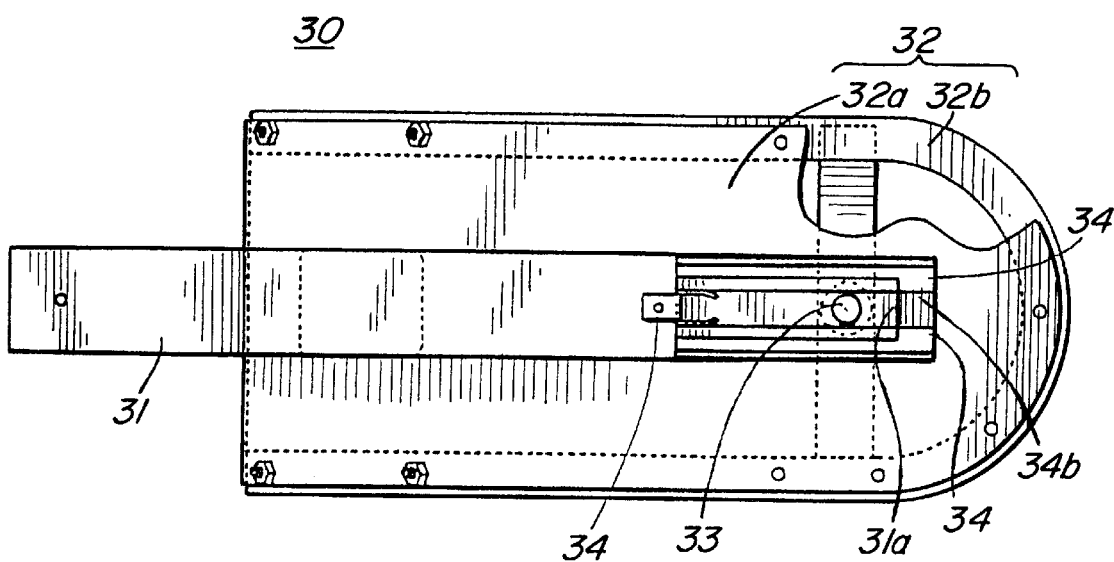
FIGS. 7(A) and 7(B) are a plan view and a rear view of the position regulating mechanism in FIG. 1
Figure 7B:
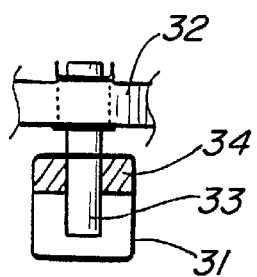
Figure 8:
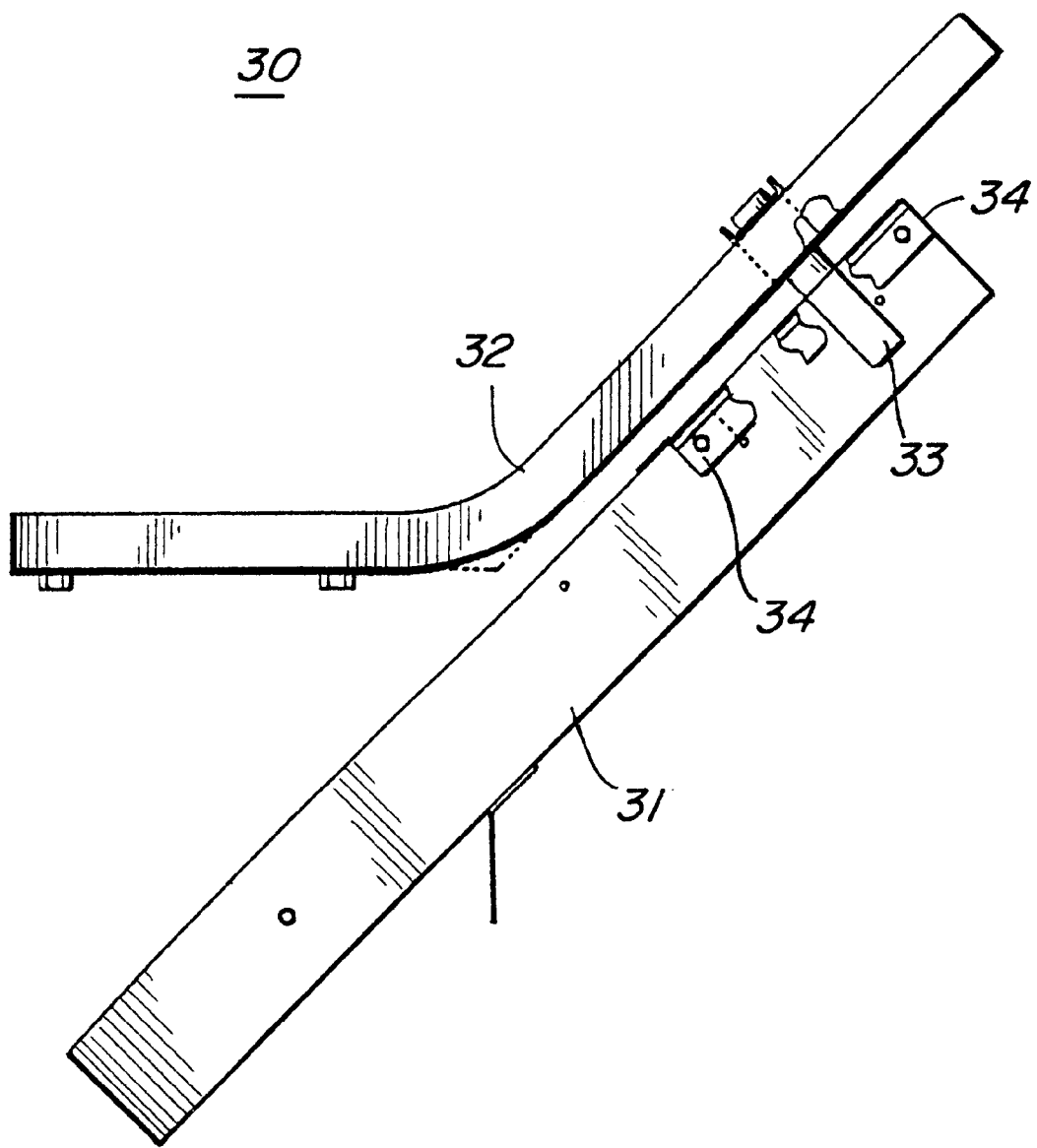
FIG. 8 is a side elevation of FIG. 7(A).

FIG. 7 includes a plan view (A) and a rear view (B) of the position regulating mechanism 30 and FIG. 8 is a side elevation of FIG. 7(A). As shown in FIG. 1, the position regulating mechanism 30 is provided with a position regulating member 31, which is secured to the rear end of the fixed frame 2, extending in a diagonal upward direction toward the rear, and an extended member 32, which is secured as an integral part to the lower end of the vehicle body 6 under the seat portion 7, extending rearward. Of these, the extended member 32 is constituted with a horizontal portion in the front and an inclined portion in the rear which extends parallel to the position regulating member 31. In addition, a mobile shaft 33 is mounted at the rear end of this inclined portion in the rear, which extends diagonally downward at a right angle to the inclined portion of the extended member 32 and the position regulating member 31. This mobile shaft 33 is inserted in guide members 34, which is provided along the rear end of the position regulating member 31, and is constituted in such a manner that it can slide freely along the guide members 34. In this structure, as shown in FIG. 1, the position regulating member 31, the extended member 32, the mobile shaft 33 and the supporting shaft 5 have the following positional relationships: the mobile shaft 33 is provided running parallel to the supporting shaft 5, with the position regulating member 31 and the inclined portions of the extended member 32 positioned in a direction running at a right angle to the supporting shaft 5.

To be more specific, as shown in FIG. 7(A), the extended member 32 is constituted by bonding an upper plate-like member 32a and a lower frame-like member 32b, and the mobile shaft 33 is positioned at a central position of the inclined portion to the rear of the extended member 32 in the left and right direction. In addition, inside the rear end of the position regulating member 31, the pair of guide members 34 are inserted, as shown in FIG. 7(B) and they are secured to the position regulating member 31 with a guide mounting metal fitting 34a. Between this pair of guide members 34, a guide groove 34b, the width of which almost matches the diameter of the mobile shaft 33, is formed, and the mobile shaft 33 is inserted in the guide groove 34b. Also, in the portion of the position regulating member 31 where the guide members 34 are inserted, a window 31a is formed for inserting the mobile shaft 33 and the width of this window 31a is set larger than the diameter of the mobile shaft 33.

(2) Factors and advantages

The operating device according to the present invention structured as described above, can achieve all of the four features (a)~(d) explained earlier and, furthermore, an added advantage of (e) miniaturization and simplification of the apparatus is achieved.

(a) Assuring operability in the state in which the feet of the operator are placed on the footstools:

In the operating device according to the present invention, since the handlebar is secured to the mobile frame 3, only the vehicle body 6 is caused to incline in the left and right direction around the supporting shaft 5 by the pivoting mechanism 10. In addition, since the operator can control his balance on the mobile frame 3 by holding on to the handlebar 4, the vehicle body can be pulled up easily with the handlebar 4 even when all his weight is placed on the vehicle body 6 with his feet off the floor or the base or the fixed frame 2 and placed on the footstools 8. Moreover, when the vehicle body 6 is inclined in the left and right direction, the operator can pull up the vehicle body 6 to the vertical position while leaving his feet on the footstools 8 by controlling his posture by holding on to the handlebar 4. Consequently, even when the vehicle body 6 becomes inclined with the operator's feet removed from the floor or the base, it is possible to restore the vehicle body 6 to the vertical position, and a feel similar to that of riding a real motorcycle is obtained.

(b) Maintaining the position of the operator's head relative to the display:

In the operating device according to the present invention, the supporting shaft 5, which constitutes the center of pivoting of the vehicle body 6, is provided at a position higher than the footstools 8 instead of being positioned at floor level or at the same height as the fixed frame 2, resulting in a reduced radius of pivoting of the vehicle body 6. Furthermore, since this supporting shaft 5 is made to incline downward from the handlebar 4 side in the front to the rear of the vehicle body 6, the radius of pivoting of the vehicle body 6, which is almost horizontal, is reduced toward the front. Because of this, when the vehicle body 6 pivots in the left and right direction around the supporting shaft 5, the distances traveled by the front portion of the vehicle body 6 in the left and right direction and in the up and down direction are smaller relative to the distances traveled by the seat portion 7 toward the rear. In addition, when the operator sits astride the vehicle body 6, he adopts a posture in which the upper portion of his body leans toward the handlebar 4 side in the front from the seat portion 7 of the vehicle body 6. Thus, the head of the operator is positioned to the front of the vehicle body 6 and, as a result, when the vehicle body 6 inclines in the left and right direction, the distances traveled by the head of the operator in the left and right direction and in the up and down direction are minimized, to facilitate viewing of the screen 1a of the display 1 by the operator.

Moreover, in the operating device according to the present invention, it is possible to slide the mobile frame 3 itself, which supports the handlebar 4 and the vehicle body 6 with the sliding mechanism 20 in the left and right direction relative to the fixed frame 2. Thus, when the operator's weight is placed on the vehicle body 6 to incline the vehicle body 6 to one side in the left and right direction with the supporting shaft 5 at the center, the load applied to the vehicle body 6 acts to move the mobile frame 3 to the opposite side from the side of inclination via the supporting shaft 5. Consequently, even when the operator inclines his upper body greatly, the actual movement in the lateral direction can be minimized so that the viewing of the screen 1a of the display 1 by the operator is facilitated.

(c) Assuring an attitude of the vehicle body that is closer to reality:

In the operating device according to the present invention, the handlebar 4 and the vehicle body 6 are provided separately and, since the supporting shaft 5, which constitutes the center of pivoting of the vehicle body 6, is inclined, when the vehicle body 6 becomes inclined, the angle of bend between the handlebar 4 and the vehicle body 6 relative to the floor or the inclination of the vehicle body 6 relative to the floor is similar in feeling to that when riding a real motorcycle through a curve. In other words, since the supporting shaft, which constitutes the center of pivoting of the vehicle body 6, is inclined, it is possible to right the vehicle body 6 with a horizontal force (torque), and this brings about a feeling even closer to that of operating a real motorcycle. For instance, when the vehicle body becomes inclined to the right, the operator's right arm becomes bent and, at the same time, his left arm is stretched to the front, and in order to right the vehicle body from this state, the right side hand grip must be pressed by extending the right arm toward the front and, at the same time, the left side hand grip must be pulled toward the operator with the left arm. This action of pushing and pulling the hand grips is extremely similar to the operation of a real motorcycle.

Moreover, in the operating device according to the present invention, when the weight of the operator is displaced on the vehicle body 6 to cause the vehicle body 6 to become inclined to one side in the left and right direction with the supporting shaft 5 at the center, the load applied to the vehicle body 6 works to cause the mobile frame 3 to move to the side opposite from the side of inclination via the supporting shaft 5, as explained earlier. In other words, it is possible to cause the vehicle body 6 to slide in the left and right direction in correspondence to inclination of the vehicle body 6 in the left and right direction. As a result, in addition to simply being able to cause the vehicle body 6 to become inclined, the feel of drifting in the lateral direction, which occurs during actual motorcycle riding, can be felt during the operation.

Figure 9:
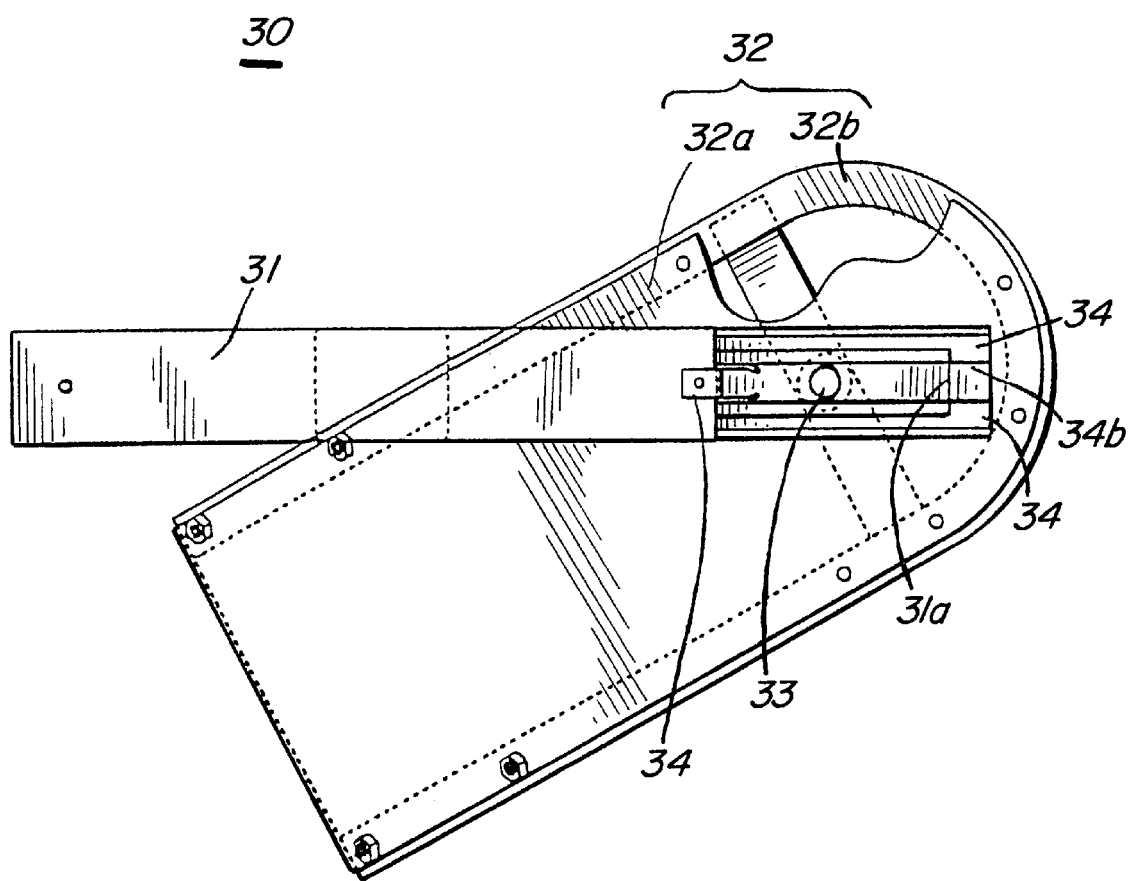
FIG. 9 is a plan view showing the state of the position regulating mechanism in FIG. 7 when the vehicle body is inclined.

Furthermore, in the operating device according to the present invention, the range of movement of the portion of the vehicle body 6 under the seat portion 7 in the left and right direction is regulated by the position regulating mechanism 30 and, at the same time, the portion of the vehicle body 6 that is ahead of the seat portion 7 is made capable of moving in the left and right direction together with the mobile frame 3 by the sliding mechanism 20. Because of this, when the operator's weight is placed on the vehicle body 6 to cause the vehicle body 6 to become inclined to one side in the left and right direction with the supporting shaft 5 at the center, the front portion of the vehicle body 6 moves over a greater distance to the opposite side from the side of inclination compared to the portion of the vehicle body 6 below the seat portion. In this case, as shown in FIG. 9, the movement of the mobile shaft 33 provided under the seat portion 7 of the vehicle body 6 in the left and right direction is regulated by the guide groove 34b of the guide members 34 and, consequently, the vehicle body 6 pivots in the horizontal direction around the mobile shaft 33 in correspondence to the movement of the portion of the vehicle body 6 ahead of the seat portion in the left and right direction, thereby assuming an attitude in which it leans diagonally forward in the horizontal direction relative to the direction in the initial state, i.e., the vehicle body 6 becomes inclined as if to fall diagonally forward. Such an inclining operation of the vehicle body 6 is extremely close to the operation that the vehicle body goes through when a real motorcycle turns a curve.

(d) Assuring reactions that are similar to the reactions of a real motorcycle:

Since, in the operating device according to the present invention, the electric motor 27 is employed in the sliding mechanism 20, even when the operator does not apply his weight in the direction of inclination of the vehicle body 6, the pinion 27b is caused to rotate by the drive force imparted by the electric motor 27 and this pinion 27b moves in the left and right direction relative to the rack of the guide rail rack 21. With this operation of the pinion 27b, it is possible to cause the mobile frame 3, to which the pinion 27b and the electric motor 27 are secured as integral parts, to move in the left and right direction relative to the fixed frame 2. As a result, it is possible to communicate the drive force imparted by the electric motor 27 in the left and right direction to the vehicle body 6 via the mobile frame 3. For instance, by controlling this electric motor 27 with a computer which projects images on the display 1, it is possible to generate reactions in the vehicle body 6 such as vibration, impact, loading, centrifugal force acting to pull up the vehicle body 6 when it is inclined, which correspond to the content of the images.

In addition, in the combination of the pinion 27b and the rack as described above, by setting the dimensions of the two members correctly, the entire load such as the mobile frame 3, the vehicle body 6 and the operator can be moved smoothly even with a small electric motor 27.

Moreover, in the operating device according to the present invention, since the means for force application 15 is provided between the support shaft 5 and the mobile frame 3, a force is applied by the means for force application 15 to the vehicle body 6 to restore its vertical position whenever the operator causes the vehicle body 6 to become inclined in the left and right direction. In other words, when the vehicle body 6 becomes inclined, the supporting shaft 5 secured to the vehicle body 6 pivots and, as a result, the means for force application 15 is pressed by the external circumferential surface of the rectangular cross section of the supporting shaft 5. When this happens, since the means for force application 15 is secured to the mobile frame 3 via the fixed member 16, the force applied to the means for force application 15 by the supporting shaft 5 in the direction of pivoting works to deform the means for force application 15. This results in the supporting shaft 5 pivoting within the deformation limits of the means for force application 15. At the same time, a force that acts to restore the original state is generated in the deformed means for force application 15, and this elastic restoring force acts as a force applied to restore the supporting shaft 5 to a position corresponding to the vertical position of the vehicle body 6. Consequently, when the vehicle body 6 is inclined, the operator can experience reactions similar to those experienced when inclining the vehicle body of a real motorcycle to negotiate a curve.

In addition, as explained earlier, while the dimensions of the vehicle body 6 in the direction of its advance is reduced when the front portion of the vehicle body 6 pivots in the horizontal direction around the mobile shaft 33 and the vehicle body 6 turns diagonally forward in the horizontal direction relative to the direction of the original state, the quantity of such displacement in dimension in the direction of advance is absorbed by the forward and downward movement of the mobile shaft 33 toward along the guide groove 34b, as shown in FIG. 9. As a result, with the position regulating mechanism 30, the pivoting operation of the vehicle body 6 in the horizontal direction can be performed smoothly.

(e) Miniaturization and simplification of structure

The operating device according to the present invention is provided with the pivoting mechanism 10, the sliding mechanism 20 and the position regulating mechanism 30 as mechanisms that regulate the relative operations among the component members, and each of these mechanisms has a simple structure to contribute to miniaturization and simplification of the entire apparatus.

For instance, as FIG. 1 clearly shows, the pivoting mechanism 10 has a simple structure in which the pillow blocks 12, the mounting blocks 13 and the means for force application 15 are provided around the supporting shaft 5 and, in particular, since the means for force application 15 constituted with four columns is provided around the external circumference of the supporting shaft 5 as a means to restore the supporting shaft 5 to a position that corresponds to the vertical position of the vehicle body 6, a very small mounting space is required for the means for force application 15.

As for the sliding mechanism 20, as clearly illustrated in FIG. 1, it has a simple structure in which the guide rail rack 21, the guide rail 22 and the sliders 23 and 24 are provided by using the space around the mobile frame 3. In this case, the electric motor 27 is used as a means for drive for sliding, and this electric motor, too, is provided by utilizing a vacant space formed within the mobile frame 3 and does not result in a larger size of the device. In addition, since the electric motor 27 is provided at a position away from the vehicle body 6, it does not present a hindrance in operation.

Furthermore, since the position regulating mechanism 30 utilizes the position regulating member 31 and the extended member 32, which constitute the structure that supports the portion under the seat portion 7 of the vehicle body 6 as they are, it has an extremely simple structure. Especially, a structure provided specially for position regulation in the position regulating mechanism 30 is constituted with only the mobile shaft 33 and the guide members 34, contributing to miniaturization and simplification of the apparatus.

(3) Other forms of embodiments

The present invention is not limited to the embodiment described above and it is possible to implement it in a number of other embodiments. The specific structures of the pivoting mechanism, the sliding mechanism and the position regulating mechanism may be changed freely. For instance, the structures of the supporting shaft and the means for force application of the pivoting mechanism may be changed freely. In addition, the structure of the means for drive of the sliding mechanism may be changed freely and a structure in which an actuator such as a linking mechanism driven by a cylinder or an electric motor is employed with its one end linked to the fixed frame 2 and the other end linked to the mobile frame 3, for instance, is possible. At the same time, a means for drive for pivoting in order to impart pivoting force to the pivoting mechanism may be provided as shown in FIG. 3. In this case, even when the operator does not apply any force, the vehicle body 6 can be righted or inclined freely by driving the motor 40. Furthermore, by controlling this means for drive for pivoting with a computer which projects images on the display, realistic reactions corresponding to the contents of the images can be generated at the vehicle body. Furthermore, by providing both the means for drive for pivoting and the means for drive for sliding and controlling them in combination with the computer, the realistic feeling is augmented with the mutually enhancing effect. In addition, it is also possible to constitute a structure in which no sliding mechanism or position regulating mechanism is provided and only the pivoting mechanism is provided with the portion of the frame that corresponds to the mobile frame 3 fixed on to the fixed frame 2. In this case, further miniaturization and simplification of the entire apparatus can be achieved.

Potential for industrial application

As has been explained, with the operating device for a simulation apparatus according to the present invention, (a) operability with the operator's feet placed on the footstools is assured. In addition, at least one of the following features (b)–(d) is achieved:

(b) maintaining the position of the head of the operator relative to the display, (c) assuring that attitudes of the vehicle body are close to reality, and (d) assuring that reactions are close to reality.

As a result, with the operating device for a motorcycle simulation apparatus according to the present invention, operation that is closer to the feeling of riding a real motorcycle can be achieved with realistic ambiance and, in addition, the structure of the entire apparatus can be miniaturized and simplified, compared to the prior art technology.

What is claimed is:

1. An operating device for a motorcycle simulation apparatus with said operating device shaped to resemble a motorcycle provided in front of a screen of a display, comprising:

a handlebar provided in front of said screen of said display, said handlebar being maintained at a fixed distance relative to said display;

a vehicle body provided across said handlebar on an opposite side from said display and having a seat portion at a position distanced from said handlebar; and a supporting shaft extending in a front and rear direction of said vehicle body to axially support said vehicle body in such a manner that said vehicle body can pivot freely relative to said handlebar about said supporting shaft wherein the vehicle body can rotate about said supporting shaft while the handlebar does not rotate.

2. An operating device for a motorcycle simulation apparatus according to claim 1; wherein:

said supporting shaft is provided on an inclination in such a manner that said supporting shaft is raised toward said handlebar.

3. An operating device for a motorcycle simulation apparatus according to claim 2, wherein:

a means for force application for applying force to said vehicle body to pivot to a vertical position is provided.

4. An operating device for a motorcycle simulation apparatus according to claim 2, wherein a means for pivoting drive for causing said vehicle body to pivot around said supporting shaft is provided.

5. An operating device for a motorcycle simulation apparatus according to claim 1; wherein:

said supporting shaft is provided at an upward position distanced from a floor surface in an area ahead of said seat portion of said vehicle body.

6. An operating device for a motorcycle simulation apparatus according to claim 5; wherein:

said supporting shaft is provided on an inclination in such a manner that said supporting shaft is raised toward said handlebar.

7. An operating device for a motorcycle simulation apparatus according to claim 6, wherein:

a means for force application for applying force to said vehicle body to pivot to a vertical position is provided.

8. An operating device for a motorcycle simulation apparatus according to claim 6, wherein a means for pivoting drive for causing said vehicle body to pivot around said supporting shaft is provided.

9. An operating device for a motorcycle simulation apparatus according to claim 5, wherein:

a means for force application for applying force to said vehicle body to pivot to a vertical position is provided.

10. An operating device for a motorcycle simulation apparatus according to claim 5, wherein a means for pivoting drive for causing said vehicle body to pivot around said supporting shaft is provided.

11. An operating device for a motorcycle simulation apparatus according to claim 1; wherein:

a means for force application for applying force to said vehicle body to pivot to a vertical position is provided.

12. An operating device for a motorcycle simulation apparatus according to claim 1; wherein:

a means for pivoting drive for causing said vehicle body to pivot around said supporting shaft is provided.

13. An operating device for a motorcycle simulation apparatus with said operating device shaped to resemble a motorcycle provided in front of a screen of a display, characterized by comprising:

a mobile frame provided in front of said screen of said display, which can move freely in a horizontal direction of said screen;

a handlebar secured to said mobile frame;

a vehicle body provided across said handlebar on the opposite side from said display, having a seat portion at a position distanced from said handlebar;

a supporting shaft provided extending in a front and rear direction of said vehicle body and being supported by said mobile frame, which axially supports said vehicle body in such a manner that said vehicle body can pivot freely relative to said handlebar, and a mobile shaft provided under said seat portion of said vehicle body, running substantially parallel to said supporting shaft, movement in said horizontal direction of said mobile shaft being regulated.

14. An operating device for a motorcycle simulation apparatus according to claim 13; wherein:

said supporting shaft is provided on an inclination in such a manner that said supporting shaft is raised toward said handlebar.

15. An operating device for a motorcycle simulation apparatus according to claim 14, wherein:

a means for drive to cause said mobile frame to move in said horizontal direction as provided.

16. An operating device for a motorcycle simulation apparatus according to claim 14, wherein:

a means for force application for applying force to said vehicle body to pivot to a vertical position is provided.

17. An operating device for a motorcycle simulation apparatus according to claim 14, wherein a means for pivoting drive for causing said vehicle body to pivot around said supporting shaft is provided.

18. An operating device for a motorcycle simulation apparatus according to claim 13; wherein;

said supporting shaft is provided at an upward position distanced from a floor surface in an area ahead of said seat portion of said vehicle body.

19. An operating device for a motorcycle simulation apparatus according to claim 18; wherein:

said supporting shaft is provided on an inclination in such a manner that said supporting shaft is raised toward said handlebar.

20. An operating device for a motorcycle simulation apparatus according to claim 19, wherein a means for drive to cause said mobile frame to move in said horizontal direction as provided.

21. An operating device for a motorcycle simulation apparatus according to claim 19, wherein:

a means for force application for applying force to said vehicle body to pivot to a vertical position is provided.

22. An operating device for a motorcycle simulation apparatus according to claim 19, wherein a means for pivoting drive for causing said vehicle body to pivot around said supporting shaft is provided.

23. An operating device for a motorcycle simulation apparatus according to claim 18, wherein a means for drive to cause said mobile frame to move in said horizontal direction as provided.

24. An operating device for a motorcycle simulation apparatus according to claim 18 wherein:

a means for force application for applying force to said vehicle body to pivot to a vertical position is provided.

25. An operating device for a motorcycle simulation apparatus according to claim 18, wherein a means for pivoting drive for causing said vehicle body to pivot around said supporting shaft is provided.

26. An operating device for a motorcycle simulation apparatus according to claim 13; wherein:

a means for drive to cause said mobile frame to move in said horizontal direction is provided.

27. An operating device for a motorcycle simulation apparatus according to claim 9; further comprising:

a fixed frame, provided in front of said screen of said display, being fixed relative to said screen;

a guide rail provided at said fixed frame extending in said horizontal direction; and a slider provided at said mobile frame, to slide along said guide rail; wherein:

said means for drive includes;

a rack provided along said guide rail;

an electric motor provided at said mobile frame; and a pinion provided at said mobile frame, which is driven by said electric motor and interlocks with said rack.

28. An operating device for a motorcycle simulation apparatus according to claim 27, wherein:

a means for force application for applying force to said vehicle body to pivot to a vertical position is provided.

29. An operating device for a motorcycle simulation apparatus according to claim 27, wherein a means for pivoting drive for causing said vehicle body to pivot around said supporting shaft is provided.

30. An operating device for a motorcycle simulation apparatus according to claim 26, wherein:

a means for force application for applying force to said vehicle body to pivot to a vertical position is provided.

31. An operating device for a motorcycle simulation apparatus according to claim 26, wherein a means for pivoting drive for causing said vehicle body to pivot around said supporting shaft is provided.

32. An operating device for a motorcycle simulation apparatus according to claim 13, wherein:

a means for force application for applying force to said vehicle body to pivot to a vertical position is provided.

33. An operating device for a motorcycle simulation apparatus according to claim 13, wherein a means for pivoting drive for causing said vehicle body to pivot around said supporting shaft is provided.

34. An operating device for a motorcycle simulation apparatus with said operating device shaped to resemble a motorcycle provided in front of a screen of a display, comprising:

a handlebar provided in front of said screen of said display, being fixed relative to said display;

a vehicle body provided across said handlebar on the opposite side from said display and having a seat portion at a position distanced from said handlebar; and a supporting shaft extending in a front and rear direction of said vehicle body to axially support said vehicle body in such a manner that said vehicle body can pivot freely relative to said handlebar, said supporting shaft is provided at an upward position distanced from a floor surface in an area ahead of said seat portion of said vehicle body.

* * * * *